United States Patent [19]

Takagi

[11] Patent Number: 5,699,144

[45] Date of Patent: Dec. 16, 1997

[54] IMAGE FORMING APPARATUS

[75] Inventor: Atsushi Takagi, Kanagawa, Japan

[73] Assignee: Fuji Photo Film Co., Ltd., Kanagawa, Japan

[21] Appl. No.: 434,845

[22] Filed: May 4, 1995

[30] Foreign Application Priority Data

May 11, 1994 [JP] Japan .................... 6-097491

[51] Int. Cl.⁶ .................... G03B 27/72; G03B 27/80
[52] U.S. Cl. .................... 355/38; 355/35
[58] Field of Search .................... 355/38, 68, 77, 355/53, 35

[56] References Cited

U.S. PATENT DOCUMENTS

| | | | |
|---|---|---|---|
| 4,589,766 | 5/1986 | Fursich et al. | 355/38 |
| 4,984,013 | 1/1991 | Terashita | 355/38 |
| 5,053,807 | 10/1991 | Uryu . | |
| 5,053,808 | 10/1991 | Takagi . | |
| 5,063,407 | 11/1991 | Takagi | 355/68 |
| 5,162,841 | 11/1992 | Terashita | 355/38 |
| 5,400,115 | 3/1995 | Muench | 355/38 |

FOREIGN PATENT DOCUMENTS

| | | |
|---|---|---|
| 0416654 | 3/1991 | European Pat. Off. . |
| 0546437 | 6/1993 | European Pat. Off. . |
| 3192247 | 8/1991 | Japan .................... G03B 27/72 |
| 3192248 | 8/1991 | Japan .................... G03B 27/72 |
| 3256035 | 11/1991 | Japan .................... G03B 27/72 |
| 695267 | 4/1994 | Japan .................... G03B 27/50 |

OTHER PUBLICATIONS

Patent Abstracts of Japan, vol. 13, No. 480 (P–952), Oct. 31, 1989, JP–A–01 191129.

*Primary Examiner*—Arthur T. Grimley
*Assistant Examiner*—Herbert V. Kerner
*Attorney, Agent, or Firm*—Sughrue, Mion, Zinn, Macpeak & Seas, PLLC

[57] ABSTRACT

An image forming apparatus has a scan exposure unit for performing a slit scan exposure on a light-sensitive material, a line sensor that is provided in an optical path branching from the optical path of slit exposing light and that reads the original image prior to the slit scan exposure of the light-sensitive material, a memory for storing image signals, a monitor for displaying a monitor image using the stored image signals, a device for designating the principal area of the original image from the monitor image, and an exposure computing unit for computing the conditions for proper exposure using both the information on the principal area and the image signals stored in said memory.

5 Claims, 9 Drawing Sheets

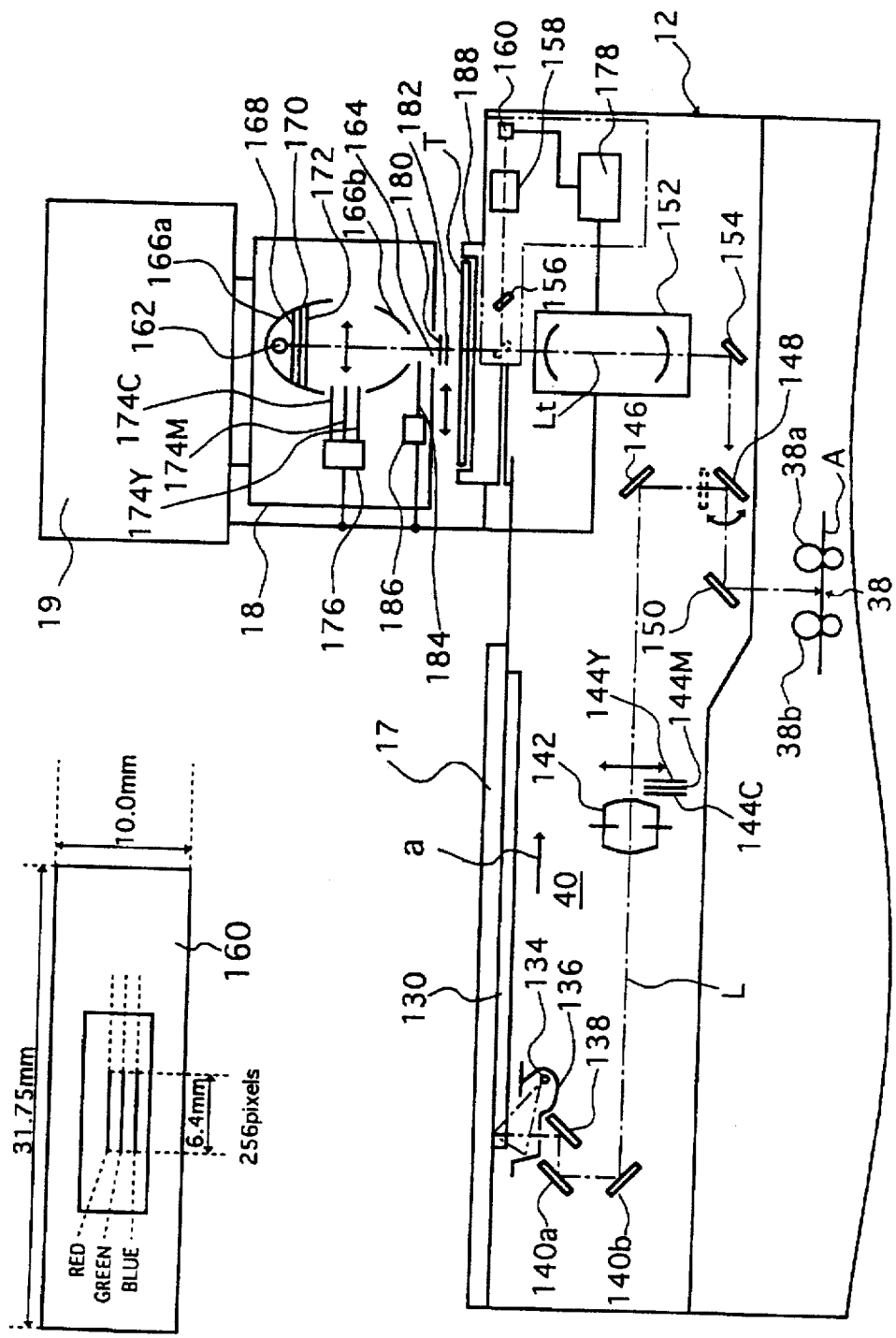

IMAGE FORMING APPARATUS

BACKGROUND OF THE INVENTION

This invention relates to an image forming apparatus such as a printer or a copier that permits the use of positive-positive light-sensitive materials which are capable of reproducing positive images from the image of positive originals including not only reflection-type originals such as prints and photographs but also transmission-type positive originals such as lantern slides (reversal films) and proofs, as well as negative-positive light-sensitive materials which are capable of reproducing positive images from the image of negative originals including transmission-type negative originals such as negative films.

Most of the conventional image forming apparatuses such as color copiers and various types of color printers have been adapted for reproducing images from reflection-type originals such as printed matter. However, the technology of recording image information has recently become so versatile that image forming apparatuses have been commercialized that are capable of image recording on light-sensitive materials by reading images not only from reflection-type originals such as printed matter and photographs but also from transmission-type positive originals such as lantern slides, proofs and microfilms.

An image forming apparatus that is adapted for the use with both a reflection-type original and a transmission-type positive original is equipped with a light source unit or a film scanning unit that compose the exposure optics for image formation from the transmission-type positive original, and the user performs imagewise exposure on the light-sensitive material by means of the appropriate exposure optics as selected in accordance with the kind of document to be duplicated and the size of the transmission-type positive original of interest.

The assignee already proposed an image forming apparatus capable of reproducing the image of positive originals (see Japanese Patent Application No. 244693/1992). This apparatus includes means for manual adjustments of color and/or density in image formation with exposure optics selected for the kind of document to be duplicated (whether it is a reflection-type original or a transmission-type positive original). The apparatus reproduces either one of the reference charts preset for the different kinds of document or the image of one of the standard originals and, looking at the reproduced image, the user can easily perform manual adjustments of color and/or density, whereby he or she is capable of forming a high-quality image in a rapid, easy and consistent manner by repeating the same procedures without regard to the type of document to be reproduced.

Photograph printers, or devices for printing transmission-type negative originals such as negative films and negatives for printing must handle originals that have been shot by many unspecified users and, hence, under varying conditions.

To cope with this situation, characteristic quantities, such as the large-area transmission density (hereunder abbreviated as "LATD"), of original images are determined and subjected to statistical processing to determine the conditions for proper exposure, such as the amount of one-shot exposure (in particular, exposure time) and conditions for color filters (the amounts by which they should be inserted into the optical path). Negative films and negatives for printing that have been shot by general users are characterized by varying shooting conditions and it is generally held that "normal" negatives which are balanced in color and density account for only about 60-70% of all the transmission-type negative originals, with about 20-30% being occupied by negatives with "density failure" which have density-biased scenes and 5-10% by negatives with "color failure" which have color-biased scenes. To deal with this situation, skilled operators use a photograph dedicated printer, determine LATD and various other image characteristic quantities for transmission-type negative originals such as negative films and negatives for printing, perform complicated processing on those characteristic quantities, and expose and develop them to produce print images. Such a photograph dedicated printer is currently used in a large number of units.

Under the circumstances, the assignee previously proposed an image recording apparatus and method in U.S. Pat. No. 5,063,407 that permits not only skilled but also unskilled operators to reproduce images from original films such as negative films.

The assignee further proposed in JPA 256032/1991 an image recording apparatus that uses an area sensor or some other suitable means to read not only the image of transmission-type negative originals but also the image of transmission-type positive originals such as lantern slides and which performs statistical processing on the acquired image characteristic quantities not only in the case where the originals were shot under proper conditions but also in the case where they were not, thereby determining the conditions for proper exposure. Using this apparatus, even unskilled operators can perform image recording in the proper manner.

As mentioned above, many transmission-type negative original images have "subject failure" characterized by color or density biases and the occurrence of such failure in transmission-type negative original images is by far frequent compared to reflection-type originals and definitely more common than in transmission-type positive original images. Hence, the degree by which color or density must be modified is so great that the required color or density adjustment covers a broad range and is difficult to accomplish. Additionally, color or density adjustments must be made as appropriate for a specific kind of negatives. Under the circumstances, image recording apparatus that handle reflection-type originals, as well as image forming apparatus that are capable of image reproduction from transmission-type positive originals have been unable to reproduce transmission-type negative originals in as easy and rapid a manner as reflection-type originals and transmission-type positive originals. It should particularly be mentioned that in the absence of an image recording apparatus that rely upon slit scan exposure and that have various functions such as the ability to designate the principal area of the original image necessary for image recording from transmission-type negative originals such as negative films and negatives for printing, it has been difficult to form images of good color and density balance from transmission-type negative originals.

Many types of photograph printers dedicated to negative films and other transmission-type negative originals, have been proposed and commercialized that have a display unit such as a CRT monitor or screen and that determine the conditions for proper exposure by designating the principal area of the displayed image while measuring and calculating various image characteristic quantities. However, all of them are intended for one-shot exposure, so they are not only bulky but also costly. In addition, they need complicated operations and a skilled operator must print a high volume of originals. Hence, it has been difficult for general users to form images by procedures as simple as when they obtain color copies with ordinary copiers and the like. Another problem arises from the fact that the apparatus under consideration are photograph-dedicated printers; they are incapable of image formation from reflection-type originals or, if they are especially adapted for negatives, images cannot be formed from transmission-type positive originals.

To perform one-shot exposure, the photograph printers under consideration use an area sensor for both photometry and display on the monitor. The number of pixels that can be measured with a photometric sensor is about 20×20 and information of this scale is used to calculate the conditions for proper exposure. On the other hand, a monitor sensor comprises much smaller pixels numbering about 256×256 pixels. Hence, the two sensors cannot be used in such a way that the data obtained with the monitor sensor correctly reflects the data from the photometric sensor and the image on the monitor does not match the printed image in terms of color density. To solve this problem, it has been necessary to perform color and/or density adjustments for a specific kind of negatives by either manually designating the kind of the negative to be duplicated or automatically reading DX codes.

In some apparatus, both photometry and displaying on the monitor are performed with the same line sensor to effect one-shot exposure but, then, different sources of illuminating light must be used and this causes difficulty in assuring a match between the exposure of a light-sensitive material and photometric sensitivity.

SUMMARY OF THE INVENTION

The present invention has been accomplished under these circumstances and has as the principal object providing an image forming apparatus that is compatible with not only negative-positive light-sensitive materials for reproducing positive images from transmission-type negative originals but also positive-positive light-sensitive materials for reproducing positive images from reflection-type originals or transmission-type positive originals, that uses exposure optics and a light-sensitive material as appropriate for the specific type of an original of interest to insure the production of finished prints of invariably proper quality by adopting the proper conditions exposure, and which thusly enables unskilled general users to form quality images at a low cost and in an easy and rapid manner.

This object of this invention can be attained by an image forming apparatus that comprises:

means for performing slit scan exposure on a light-sensitive material being transported in synchronism with the scanning of an original image;

a line sensor that is provided in an optical path branching from the optical path of slit exposing light in said slit scan exposure means and that reads said original image prior to the slit scan exposure of said light-sensitive material;

a memory for storing image signals as read by said line sensor;

a monitor for displaying a monitor image using the image signals stored in said memory;

means for designating the principal area of said original image from the image displayed on said monitor; and exposure computing means for computing the conditions for proper exposure using both the information on the principal area as designated by said principal area designating means and the image signals stored in said memory.

In a preferred embodiment, said slit scan exposure means has means for performing automatic color and/or density adjustments in accordance with given conditions for exposure, said original image is scanned by the slit scan exposure means and read by the line sensor prior to the slit scan exposure of said light-sensitive material, the acquired image signals are stored in the memory, processing is performed with the large-area transmission density as calculated from the stored image signals and the thus processed original image is reproduced and displayed on the monitor, said principal area is designated from the displayed monitor image by the principal area designating means and, after the conditions for proper exposure are computed from the information on the principal area as designated by the principal area designating means and the image signals stored in said memory, the color and/or density of said slit scan exposure means are adjusted automatically in accordance with the computed conditions for proper exposure, and slit scan exposure is performed on said light-sensitive material.

In another preferred embodiment, the apparatus is furnished with such a capability that prior to the slit scan exposure of said light-sensitive material, a monitor image as modified by the conditions for proper exposure that have been computed by said exposure computing means is displayed on said monitor.

The image forming apparatuses described above may have means for manually adjusting the conditions for exposure by referring to the monitor image displayed on said monitor, scanning said original image by the slit scan exposure means and reading it by the line sensor prior to the slit scan exposure of said light-sensitive material, storing the acquired image signals in the memory, performing processing with the large-area transmission density as calculated from the stored image signals and reproducing the thus processed original image for display on the monitor, designating said principal area from the displayed monitor image by the principal area designating means, computing the conditions for proper exposure from the information on the principal area as designated by the principal area designating means and the image signals stored in said memory, then modifying the monitor image on the basis of the computed conditions for proper exposure, manually adjusting, as required, the computed conditions for proper exposure with reference being made to the displayed monitor image, thereafter adjusting the color and/or density of said slit scan exposure means on the basis of the adjusted conditions for proper exposure, and performing slit scan exposure on said light-sensitive material.

In each of the apparatuses described above, the line sensor preferably has spectral sensitivities that approximate the spectral sensitivity characteristics of a negative-positive light-sensitive material for forming positive images from negative originals and the number of pixels that can be read by the line sensor is at least twice the size of the original. In yet another preferred embodiment, the automatic adjusting means adjusts color and density when a negative-positive light-sensitive material is used, and adjusts only density when a positive-positive light-sensitive material for forming positive images from positive originals is used, with both adjustments being based on the conditions for exposure that have the characteristic quantities of the principal area added by the exposure computing means after it has been designated by the principal area designating means.

The image forming apparatus of the invention is capable of forming the images of reflection-type originals (e.g. prints) and transmission-type positive originals (e.g. lantern slides) on positive-positive light-sensitive materials, and the images of transmission-type negative originals (e.g. negative films) on negative-positive light-sensitive materials by slit scan exposure. In the case of using transmission-type negative originals, the slit scan exposure of a light-sensitive material is preceded by the steps of scanning the original image by slit scan exposure means and reading the image with a line sensor, preferably one having a spectral sensitivity that approximates the spectral sensitivity of a negative-positive light-sensitive material, storing the thus read image as an image signal in a memory, displaying the image on a monitor, preferably after density adjustment using large-area transmission density (LATD). The user then designating the principal area of the original image as he or she looks at the displayed monitor image, performing exposure computation using the information on the position of the designated principal area and the image signal stored in the memory, thereby computing the conditions for proper exposure, preferably displaying the original image on the monitor after it has been color and/or density adjusted on the basis of the computed conditions for proper exposure, more preferably the user determining more appropriate conditions for exposure by manual color and/or density adjustments that may be performed as they become necessary when looking at the modified monitor image, adjusting, preferably automatically, the color and/or density of the slit scan exposure means on the basis of one of the above-mentioned groups of conditions for exposure, and performing slit scan exposure on a given light-sensitive material.

The image forming apparatus of the invention may preferably be so adapted that when performing slit scan exposure of a negative-positive light-sensitive material from a transmission-type negative original, both color and density are adjusted on the basis of the conditions for proper exposure as determined by exposure computation but when performing slit scan exposure of a positive-positive light-sensitive material from a reflection-type original or a transmission-type positive original, only density is adjusted automatically on the basis of the conditions for proper exposure.

Thus, according to the invention, both photometric and monitor data are acquired with the same line sensor having a spectral sensitivity that approximates the spectral sensitivity of the negative-positive light-sensitive material and this provides such a good match between the monitor image and the printed image that the user, while looking at the monitor image, can designate the principal area of the original image and even perform color and/or density adjustments to insure that printed images can at all times be finished under the best conditions from not only positive originals such as reflection-type originals and transmission-type positive originals but also from negative originals such as negative films.

BRIEF DESCRIPTION OF THE DRAWINGS

FIG. 3 is a simplified cross-sectional view showing the interior of the exposure unit in the image recording apparatus of FIG. 2, as well as the interior of a film scanning unit that may optionally be loaded in the apparatus;

FIG. 4 is a plan view showing schematically the line sensor that is used in the optics for performing slit scan exposure in the image recording apparatus shown in FIG. 3;

DETAILED DESCRIPTION OF THE INVENTION

The image forming apparatus of the present invention will now be described in detail with reference to the preferred embodiment shown in the accompanying drawings.

Figure 1:
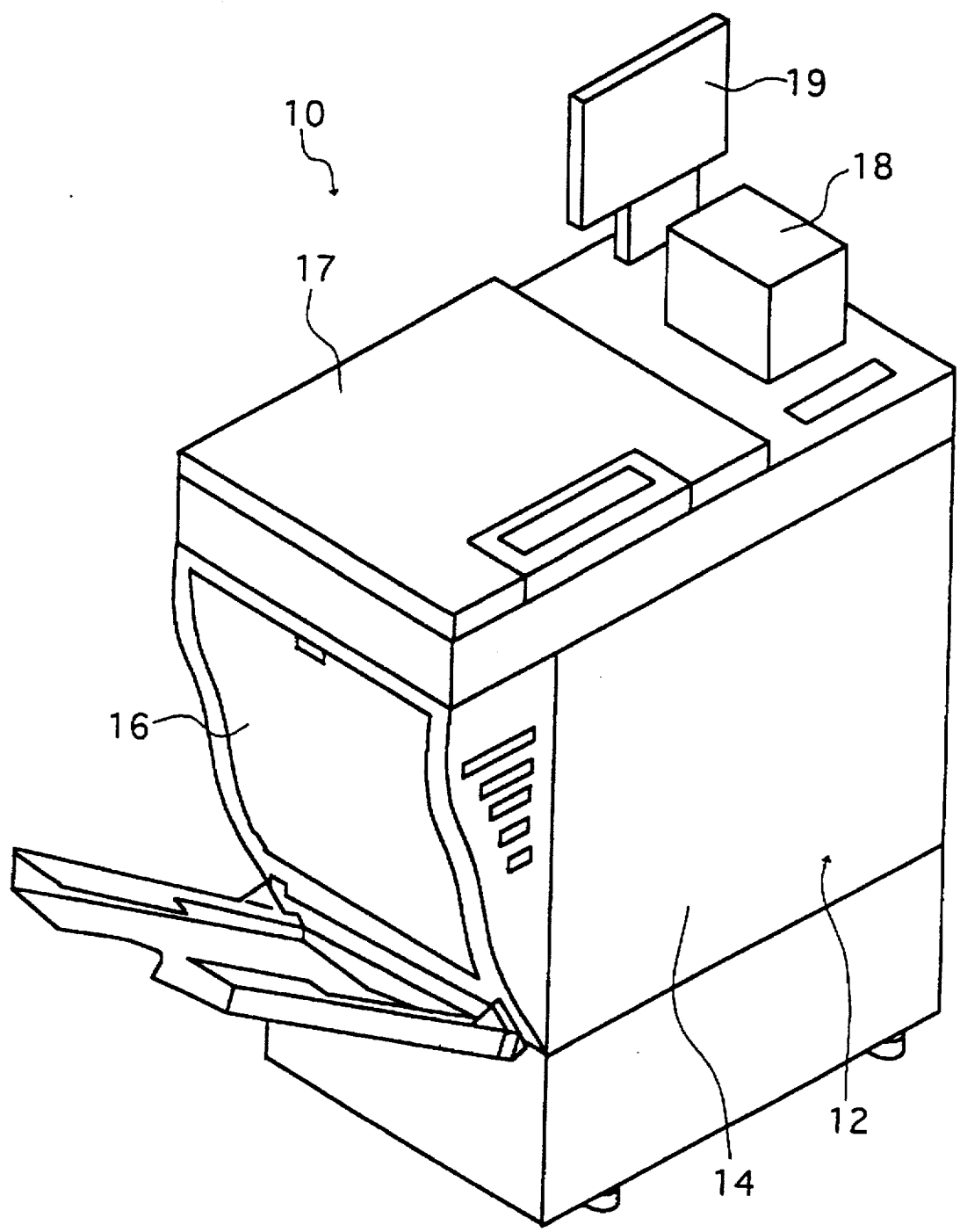
FIG. 1 is a simplified perspective view of an embodiment of the image forming apparatus of the invention.
Figure 2:
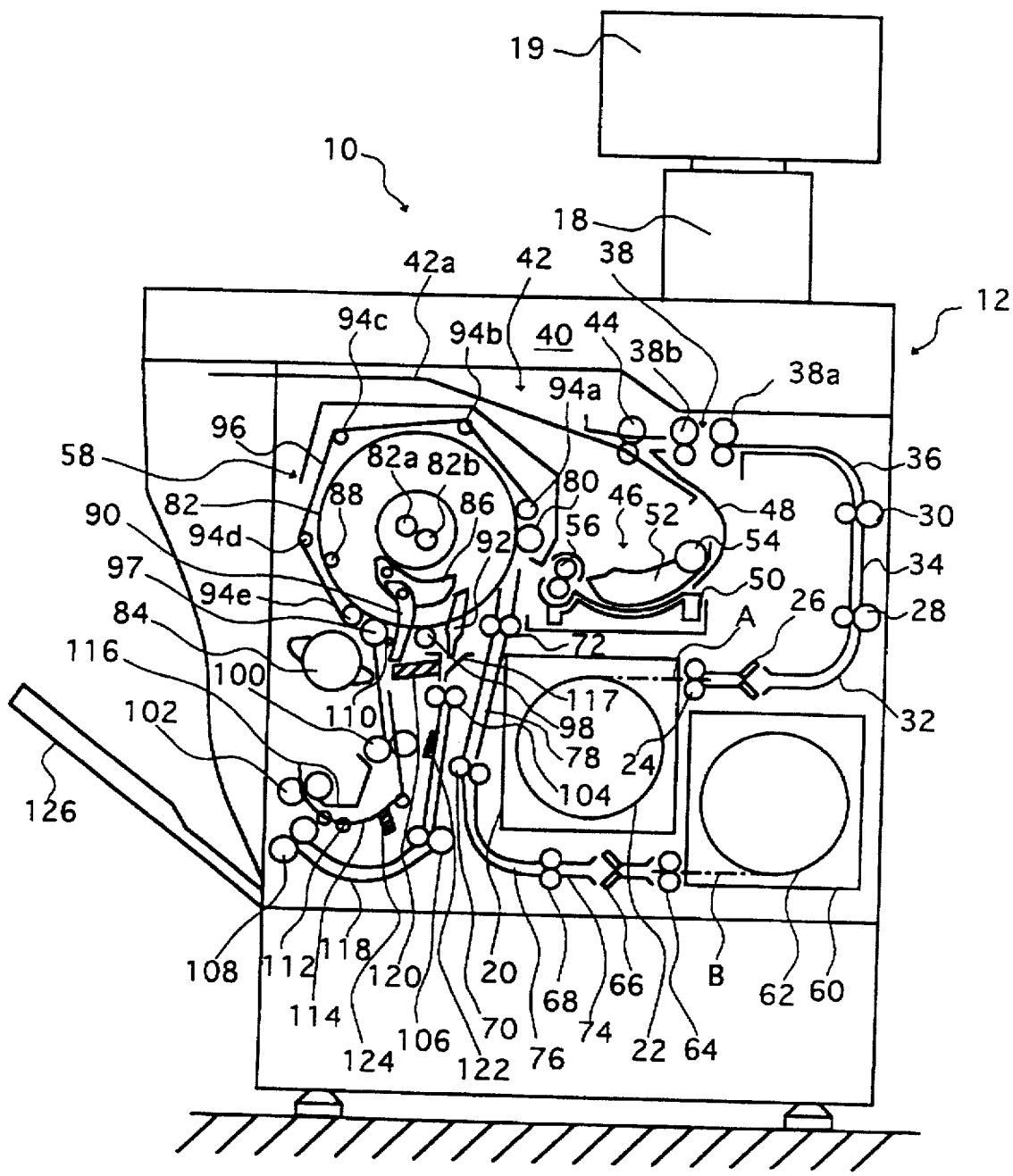
FIG. 2 is a simplified cross-sectional view showing the interior of the image recording apparatus shown in FIG. 1.

FIG. 1 is a perspective exterior view of one embodiment of the image recording apparatus of the present invention. FIG. 2 is a simplified diagrammatic cross-sectional view showing the interior of the image recording apparatus. FIG. 3 is a simplified diagrammatic cross-sectional view of the slit scanning exposure unit and the film scanning unit used in the image recording apparatus.

The image recording apparatus shown in FIG. 1 is an apparatus that uses as a recording medium a thermally processable (thermally developable or heat-developable) light-sensitive material that requires thermal development and which transfers and forms an image onto an image-receiving layer in an image-receiving material in the presence of an image-forming solvent such as water. Using this apparatus, the image on reflection-type originals such as printed matter and photographs and the image on transmission-type positive originals such as 135 size lantern slides and proofs, and the image on transmission-type negative originals such as negative films can be recorded on either positive-positive or negative-positive light-sensitive materials as properly selected according to the specific type of original to be duplicated. It should however be noted that these are not the sole applications of the invention.

The light-sensitive materials which can be used on the image recording apparatus of the present invention may be of any types that are capable of forming latent images by imagewise exposure and processing it by a predetermined procedure to produce a visible image. Hence, light-sensitive materials that may be used are exemplified by conventional types of color photographic materials (e.g. negative films, reversal films and color photographic papers), color diffusion transfer light-sensitive materials, thermally processable color photographic materials and light-sensitive and pressure-sensitive color photographic materials.

If a positive image is to be formed from a positive original including the reflection-type original such as printed matter and a photograph, and a transmission-type positive original such as the lantern slide and reversal film, so-called "positive-positive" light-sensitive materials may specifically be used; if a positive image is to be formed from a negative original including a transmission-type negative original such as the negative film and a negative document, so-called "negative-positive" light-sensitive materials should be used.

The image recording apparatus generally shown by 10 in FIG. 1 comprises a body (housing) 12 that has a front door 14 and a side door 16. To have the interior of the apparatus exposed, these doors may be opened. Each door is provided with a safety system using a so called "interlock mechanism" (not shown) that turns off power to specified areas, the moment the doors are opened.

The image recording apparatus 10 is fitted on the top (left side in FIG. 1) of the body with a detachable platen cover 17 for pressing the original located on a platen (a document platen) and on the top (right side in FIG. 1) of the body with a detachable film scanning unit 18 for copying small-size transmission-type originals such as 135 size color negatives and lantern slides, when copying the image of a comparatively large transmission-type original such as a 4×5 size lantern slide, a proof and a sleeve, the platen cover 17 is removed or opened, and a dedicated light source unit is placed on top of the image recording apparatus in a predetermined position in such a way that it covers the upper side of the platen.

Positioned on top of the body 12 of the image recording apparatus 10 and behind the film scanning unit 18 is a monitor 19 that displays an original image as read by a line sensor 160 (to be described later) prior to exposure of the thermally processable light-sensitive material.

The image recording apparatus 10 has a light-sensitive material magazine 20 positioned in the lower part of the center of the body 12 as shown in FIG. 2. The magazine 20 contains a roll 22 of a thermally processable light-sensitive material A. The thermally processable light-sensitive material A is wound on itself in such a way that its light-sensitive surface (its exposure surface) faces down when withdrawing it. An exit of the thermally processable light-sensitive material A is formed at the right upper portion of the light-sensitive material magazine 20 as seen in FIG. 2. A roller pair 24 for withdrawing and transporting the thermally processable light-sensitive material A from the magazine 20 is positioned near the exit.

A cutter 26 is positioned downstream of the roller pair 24 in the direction of the transport of the thermally processable light-sensitive material A (the term "downstream" as used hereinafter shall always be used with respect to the transport of the light-sensitive material). The cutter 26 will cut the thermally processable light-sensitive material A to a predetermined length after it has been withdrawn out of the magazine 20. The cutter 26 typically consists of a fixed blade and a moving blade. The moving blade is moved up and down by a known means such as a cam to engage the fixed blade for cutting the thermally processable light-sensitive material A.

After the cutter 26 is activated, the withdrawing roller pair 24 will rotate in a reverse direction, thereby transporting the thermally processable light-sensitive material A backward up to a position where the roller pair 24 barely grips the front end portion of the thermally processable light-sensitive material A. After the material has been moved backward, the withdrawing roller pair 24 may release it so that its leading end portion will not be damaged.

Transport rollers 28 and 30 and transport guide plates 32, 34 and 36 are positioned downstream of the cutter 26 so as to transport the thermally processable light-sensitive material A upward to an exposing section 38. The exposing section 38 is provided between transport roller pairs 38a and 38b and equipped with an exposure unit 40 on its top. In the illustrated image forming apparatus 10, the thermally processable light-sensitive material A is transported through the exposing section 38 as it is held in a predetermined position by means of transport roller pairs 38a and 38b and the transported light-sensitive material A is subject to slit scan exposure by means of slit light that carries the original image information from the exposure unit 40 or film scanning unit 18.

Description of the exposure unit 40 and the film scanning unit 18 will be given later.

A switchback section having a transport guide plate 42a and a transport roller pair 44 is provided alongside the exposing section 38. A water applicator section 46 is provided below the exposing section 38.

The thermally processable light-sensitive material A that has been withdrawn out of the magazine 20 and that has been transported to the exposing section 38 where it is imagewise exposed is brought into the switchback section 42 by means of the roller pair 44 and the guide plate 42a. Then, the roller pair 44 rotates in reverse direction so that the light-sensitive material A is ejected from the switchback section 42 and guided by a transport guide plate 48 to be transported to the water applicator section 46.

The water applicator section 46 has an application tank 50 filled with an image forming solvent and a guide member 52 that is positioned in a face-to-face relationship with the tank 50. A supply roller 54 for bringing the thermally processable light-sensitive material A into the tank 50 is positioned at an end of the water applicator section 46 which is upstream of the tank 50, and a squeeze roller pair 56 for removing excess water from the light-sensitive material A is positioned at the other end of the water applicator section 46 which is downstream of the tank 50.

The thermally processable light-sensitive material A that has been exposed in the exposing section 38 is driven by the supply roller 54 to pass between the application tank 50 and the guide member 52 as it is coated with water which is an image forming solvent. Thereafter, the light-sensitive material A is passed through the squeeze roller pair 56 so that it is freed of excess water.

The underside of the application tank 50, namely, the side that is opposite the surface of the thermally processable light-sensitive material A which is to be exposed, is provided with a plurality of ribs that are inclined with respect to the direction of transport of the light-sensitive material A. These ribs not only reduce the frictional resistance that will develop when the light-sensitive material A passes through the tank 50, they also prevent the light-sensitive material A from being damaged in particular areas.

On the other hand, the guide member 52 made of metallic material such as aluminum is pivotablly supported coaxially with the supply roller 54 in such a way that it can be moved toward and away from the application tank 50.

A thermal development and transfer section 58 is positioned downstream of the water applicator section 46. The thermally processable light-sensitive material A coated with water and freed of excess water by means of the squeeze roller pair 56 is sent to the thermal development and transfer section 58.

An image-receiving material magazine 60 is positioned to the right of the magazine 20 as seen in FIG. 2. The magazine 60 contains a roll 62 of an image-receiving material B. The image-receiving material B as contained in the magazine 60 is wound on itself in such a way that its surface where image is to be transferred faces up. The image-receiving material B is smaller in width (dimension in the direction perpendicular to the transport direction) than the thermally processable light-sensitive material A in order to insure that the two members can be easily separated after the thermal development which will be described hereinafter.

An exit of the image-receiving material B is formed at the left upper portion of the image-receiving material magazine 60 as seen in FIG. 2. A withdrawing roller pair 64 for withdrawing and transporting the image-receiving material B is positioned near the exit of the magazine 60. After the image-receiving material B is withdrawn by the withdrawing roller pair 64, it releases the image-receiving material B so that its leading end portion will not be damaged.

A cutter 66 is positioned downstream of the roller pair 64 so that it cuts the image-receiving material B to a predetermined length after it has been withdrawn out of the magazine 60. The cutter 66 typically consists of a fixed blade and a moving blade. The moving blade is moved up and down by a known means such as a cam to engage the fixed blade for cutting the image-receiving material B. It should be mentioned here that the image-receiving material B is cut to a shorter length than the light-sensitive material A in order to insure that the two members can be easily separated after the thermal development which will be described hereinafter.

Positioned downstream of the cutter 66 are transport roller pairs 68, 70 and 72, and transport guide plates 74, 76 and 78; the image-receiving material B that has been cut to a predetermined length is transported from below the magazine 20 upward so that it is brought into the thermal development and transfer section 58. The transport roller 72 also serves as a registration roller for correcting any "skew" of the image-receiving material B that may have occurred as a result of transport. The "skew" corrected image-receiving material B is thus brought into the thermal development and transfer section 58.

A laminating roller 80 for bringing the thermally processable light-sensitive material A and image-receiving material B into a unitary assembly is positioned downstream of the squeeze roller pair 56 and the transport roller pair 72. The laminating roller 80 has its circumference covered with silicone rubber (e.g. with a thickness of 2.53 mm and a hardness of ca. 40 degrees) and is urged at both axial ends with a predetermined force (e.g. about 9 kg) so that it is in pressure-contact with a heating drum 82 in the thermal development and transfer section 58. It is coupled to a drum motor 84 by a known driving force transmission system (not shown) so that the driving force of the motor 84 is transmitted to the roller 80 for rotating it.

In the illustrated image recording apparatus 10, the thermally processable light-sensitive material A and the image-receiving material B are transported by the squeeze roller pair 56 and the transport roller pair 72 at a speed slightly (say, about 2%) slower than they are transported by the laminating roller 80; thus, the thermally processable light-sensitive material A and the image-receiving material B are subjected to some back tension as they are transported by the laminating roller 80.

The thermally processable light-sensitive material A is brought into the gap between the laminating roller 80 and the heating drum 82 by means of the squeeze roller pair 56. Except that the light-sensitive material A precedes the image-receiving material B by a predetermined length, the transport of the two members is synchronous and the image-receiving material B is likewise brought into the gap between the laminating roller 80 and the heating drum 82 so that it is placed in a superposed relationship with the light-sensitive material A.

As already mentioned, the light-sensitive material A is slightly longer than the image-receiving material B, not only in the widthwise direction but also in the longitudinal (transport) direction and, hence, when superposed, the four sides of the former will project beyond the latter.

A cam 86 and a feeler 88 are fixed to a lateral side of the heating drum 82 in the thermal development and transfer section 58. Cam 86 is adapted to be engageable with stripping fingers 90 and 92 (to be described later) on the heating drum 82 and as it rotates, the cam 86 engages the fingers 90 and 92 successively to pivot them. Feeler 88 is used to check whether the heating drum 82 is in registry with each of the light-sensitive material A and the image-receiving material B.

A pair of halogen lamps 82a and 82b are contained in the heating drum 82. The two halogen lamps 82a and 82b produce different powers, say, 400 W and 450 W, for heating the surface of the drum 82 to a predetermined temperature (e.g. 82° C.). In the illustrated image recording apparatus 10, both lamps are used to heat the drum 82 to the predetermined temperature but lamp 82a alone is used during steady-state operation after the predetermined temperature has been reached.

An endless belt 96 is would around the heating drum 82 as it is stretched on five rollers 94a, 94b, 94c, 94d and 94e. The endless belt 96 comprises a woven fabric material covered with rubber. The four rollers 94a–94d are made of stainless steel whereas the roller 94e is made of rubber. The outside surface of the endless belt 96 between the rollers 94a and 94e is in pressure-contact with the circumference of the heating drum 82.

The roller 94c has such a shape that both axial ends taper axially outward and, additionally, it is urged with a force of about 2 kg at both axial ends in a direction away from the heating drum 82. This is effective in holding the endless belt 96 at a constant tension so as to retain the force of its pressure contact with the heating drum 82 while preventing it from offsetting under rotation.

The rubber roller 94e is coupled to the drum motor 84 by means of a known driving force transmission system (not shown); hence, as the roller 94e rotates in the illustrated image recording apparatus 10, the endless belt 96 is rotated and the rotational force is transmitted to the heating drum 82 by the force of friction between the endless belt 96 and the heating drum 82, which in turn rotates.

The known driving force transmission system (not shown) allows the drum motor 84 to drive a plurality of driven parts in unison, including roller 94e, laminating roller 80, squeeze roller pair 56, as well as the following components to be described later: a bending guide roller 97, a stripping roller 98, light-sensitive material ejecting roller pairs 100 and 102, and image-receiving material ejecting roller pair 104, 106, and 108.

The thermally processable light-sensitive material A and the image-receiving material B that have been combined by the laminating roller 80 are transported as they are held in the superposed relationship between the heating drum 82 and the endless belt 96 so that they travel over a distance equal to about two-thirds of the circumference of the heating drum 82 (between rollers 94a and 94e). In the illustrated apparatus 10, the rotation of the heating drum 82 (hence, the rotation of the roller 94e) is ceased as the thermally processable light-sensitive material A and the image-receiving material B as they are completely confined between the heating drum 82 and the endless belt 96 so that they are heated for a predetermined time. In the illustrated case of image formation, the thermally processable light-sensitive material A is heated to release mobile dyes while, at the same time, the released dyes are transferred onto the dye-fixing layer in the image-receiving material B so that a visible image is formed on the image-receiving layer in the image-receiving material B.

Bending guide roller 97 is positioned downstream of the roller 94e in the direction of the rotation of the drum 82; this is a roller made of silicone rubber and pressed against the circumference of the heating drum 82 under a predetermined force. The thermally processable light-sensitive material A and the image-receiving material B that have been transported by the heating drum 82 and the endless belt 96 will be further transported by the bending guide roller 97.

Stripping finger 90 and a pinch roller 110 are positioned downstream of the guide roller 97. Stripping finger 90 is pivotally supported on a shaft and it is allowed to pivot under the action of the cam 86 so that it can contact or depart from the surface of the heating drum 82. The pinch roller 110 is normally held against the bending guide roller 97 at a predetermined pressure and adapted in operative association with the pivoting of the stripping finger 90 in such a way that when the latter contacts the heating drum 82, the roller 110 will get clear of the guide roller 97.

When both the light-sensitive material A and the image-receiving material B have been transported the position of stripping finger 90, the cam 86 works to have the finger contact the heating drum 82 and the front end of the light-sensitive material A which has been superposed on the image-receiving material B after a predetermined length of lead engages the finger 90, which then strips the light-sensitive material A from the surface of the heating drum 82.

When the front end of the light-sensitive material A is stripped from the heating drum 82 by the predetermined length, the cam 86 works to get the finger 90 clear of the heating drum 82 while, at the same time, the pinch roller 110 contacts the guide roller 97 so that the stripped front end of the light-sensitive material A is held between the two rollers 110 and 97. Hence, the light-sensitive material A which has been stripped from the heating drum 82 is transported downward as it is held between the pinch roller 110 and the bending guide roller 97.

Light-sensitive material ejecting roller pairs 100 and 102 a plurality of guide rollers 112 and a transport guide plates 114 are positioned downstream of the pinch roller 110 and guide roller 97; these members and guide plates are so adapted that the light-sensitive material A which has been stripped from the heating drum 82 is transported first downward, then to the left as seen in FIG. 2 so that it is ejected into a scrap light-sensitive material stack box 116.

The light-sensitive material ejecting roller pairs 100 and 102 are so adapted that they transport the thermally processable light-sensitive material A at a speed about 1-3% slower than the peripheral speed of the rotating heating drum 82 so that the light-sensitive material A will not be subjected to unnecessary tension. A drying fan 124 is positioned near the transport guide plate 114 to accelerate the drying the thermally processable light-sensitive material A.

Stripping roller 98 and stripping finger 92 are positioned downstream of the guide roller 97 and stripping finger 90 in the direction of the rotation of the heating drum 82. Stripping roller 98 is made of silicone rubber having a surface roughness of at least 25S and is urged against the circumference of the heating drum 82 at a predetermined pressure so that it will rotate under the action of the drum motor 84 as mentioned a paragraphs ago. On the other hand, the stripping finger 92 is so adapted that it will pivot under the action of the cam 86 to either contact or depart from the circumference of the heating drum 82.

If the light-sensitive material A is stripped from the heating drum 82 and when only the image-receiving material B is transported around the drum 82, the cam 86 works to have the stripping finger 92 contact the drum 82, thereby stripping the front end of the image-receiving material B. At the same time, the stripping roller 98 and the stripping finger 92 contact the heating drum 82 and guide the image-receiving material B to bend downward for further transport.

Image-receiving material ejecting roller pairs 104, 106 and 108, as well as transport guide plates 118 are positioned downstream of the strip roller 98 and the image-receiving material B which has been stripped from the heating drum 82 is transported first downward, then to the left as seen in FIG. 2 so that it is ejected onto a tray 126 fixed on the left side of the housing 12.

A drum fan 120 is positioned near the transport guide plate 117 so that it will accelerate the drying of the image-receiving 117 so that it will accelerate the drying of the image-receiving material B as it is heated by the heating drum 82. It should be noted that the drum fan 120 is not operated unless it is necessary depending on the specific conditions of the surrounding atmosphere in order to assure uniformity in the temperature distribution of the heating drum 82.

Additionally, a ceramic heater 122 is provided on the transport guide plate 118 to further promote the drying of the image-receiving material B. The ceramic heater 122 is set at a temperature of about 70° C.

The thermal development and transfer section 58 having the construction described above is configured as an integral unit when taken as a whole and it is adapted to be pivotal in a direction that is opposite to the water applicator section 46 with respect to the body 12. Hence, if jamming or other troubles occur, the user may first open the side door 16 on the body 12, then open and move the thermal development and transfer section 58, and take the necessary remedial action.

We now describe the exposure unit 40 and the film scanning unit 18 in the image recording apparatus 10 with reference to FIG. 3.

The exposure unit 40 provides exposure optics that is used primarily for copying the images of reflection-type originals such as printed matter and photographs, and those of comparatively large-size transmission-type originals such as proofs and lantern slides.

As FIG. 3 shows, a document platen 130 and a platen cover (document pressing plate) 17 are positioned on top of the body 12 of the image recording apparatus 10; the document platen 130 is used to carry a reflection-type original and typically made of transparent glass, and platen cover 17 is fitted as required to fix the reflection-type original on the platen 130 and may be removed if there is no need to use it.

When copying the image of a comparatively large-size transmission-type original such as a proof or a sleeve, the platen cover 17 is removed and a dedicated light source unit for illuminating the document on the platen 130 from above is mounted in a predetermined position.

Located below the document platen 130 is a light source unit which is an integral assembly of an exposing light source 134 to be used for copying the image of the reflection-type original, a reflector 136 and a mirror 138. In the illustrated apparatus, the reflector 136 also serves as a slit defining member that restricts the width, taken in the scanning direction, of reflected light from the reflection-type original (or transmitted light through a transmission-type original) after emitting from the light source 134.

The light source unit moves beneath the platen 130 in the scanning direction indicated by arrow a so that the reflection-type original is illuminated with light from the light source 134. It should be mentioned here that when copying a large-size transmission-type original using a dedicated light source unit, the light source 134 is not lit but the light source unit is simply moved to scan the underside of the platen 130, whereupon the transmitted light from the transmission-type original passes through the slit.

The light emitted from the light source 134 is reflected by the reflection-type original, passes through the slit and is reflected by the mirror 138 to travel in a predetermined direction. The reflected light is then admitted into a mirror unit which is an integral assembly of two mirrors 140a and 140b and by which the light traveling in the optical path L is reflected in predetermined directions. The mirror unit is adapted to move in the same direction as the above-mentioned light source unit but at one half its speed.

Located downstream of the mirror unit in the optical path L is a lens unit 142 which is an integral assembly of an imaging lens and a variable diaphragm for adjusting the quantity of light (i.e., density). The variable diaphragm consists typically of two light-shielding plates that are opposed to each other in a direction perpendicular to the optical path L and which can be inserted into or removed from the optical path as required. The quantity of reflected light is controlled by adjusting the gap between the two light-shielding plates.

A color filter unit for adjusting color balance is positioned downstream of the lens unit 142. The color filter unit may be composed of three color filter plates, namely, a Y (yellow) filter 144Y, a M (Magenta) filter 144M and a C (cyan) filter. The color balance of reflected light is controlled by adjusting the amount in which each of the three color filter plates is inserted into the optical path L.

Located downstream of the color filter unit in the optical path L are three mirrors 146, 148 and 150 for causing the reflected light to be reflected in predetermined directions. The oncoming reflected light in the optical path L is further reflected in predetermined directions by those mirrors and keeps traveling in the optical path L until it reaches the exposing section 38, where it is focuses for exposure of the thermally processable light-sensitive material A in the process of scanning transport.

The mirror 148 is adapted to be pivotal; for copying reflection-type originals and large-size transmission-type originals using the exposure unit 40, the mirror 148 takes the position indicated by a solid line in FIG. 3 and for copying a small-size transmission-type T such as a color negative using film scanning unit 18, the mirror 148 moves to the position indicated by a dashed line in FIG. 3.

The exposure unit 40 is also fitted with an image sensor (not shown) that measures the quantity of reflected light for the respective colors, red (R), green (G) and blue (B). The image sensor reads the original image in a prescanning step and determines the amount by which variable diaphragm in the lens unit is to be inserted into the optical path L, as well as the amounts by which the respective color filter plates in the color filter unit are to be inserted into the optical path L.

As already mentioned, the illustrated image recording apparatus 10 is also capable of copying small-size transmission-type originals such as a color negative and a lantern slide; the film scanning unit 18 is mounted detachably on top of the right portion of the body 12 to provide exposure optics for copying the image of transmission-type original T. The exposure unit 40 lying below the film scanning unit 18 accommodates the following components: a zoom lens 152 and a mirror 154 that compose exposure optics for performing slit scan exposure on the transmission-type original T, as well as a moving mirror 156, imaging lens 158 and a line sensor 160 for measuring the quantity, color, etc. of transmitted light through the transmission-type original T.

The film scanning unit 18 illuminates the transmission-type original T with light from the light source 162 as it moves in synchronism with the transport of the thermally processable light-sensitive material A. The light transmitted through the original T and the slit 164 in that order is projected onto the light-sensitive material A as enlarged with zoom lens 152 at a magnification of 200–850%, whereby the light-sensitive material A is exposed to the transmitted light through the original T for copying the image of that original.

The light source 162 may be of any type that is suitable for color reprography, as exemplified by a halogen lamp and a flash lamp. Located above the light source 162 is a reflector 166a by which the light from the light source 162 is reflected toward the original T, and located below the light source 162 is a reflector 166b that is opposed to the reflector 166a so an even higher optical efficiency is achieved. The bottom end of the reflector 166b has an opening through which light can pass.

Located downstream of the light source 162 along the optical path Lt are an IR cut filter 168, a UV cut filter 170 and a B-G notch filter 172 for separating blue light from green light.

Located downstream of the B-G notch filter 172 is a filter section that adjusts the color balance of the light illuminating the transmission-type original T and, hence, the color balance of the image to be formed. The filter section is composed of three color filter plates, Y filter 174Y, M filter 174M and C filter 174C, and a drive unit 176 which allows the respective filters to be inserted into the optical path Lt.

The drive unit 176 comprises basically a drive source such as a pulse motor and known moving (transmission) means such as a rack and pinion. In order to set the conditions for image formation in accordance with the amount of color adjustment to be performed by the user, as well as with the amount of color adjustment as determined by the modified conditions for exposure from the transmission-type original T, the drive unit 176 moves the respective color filter plates so that they are inserted into the optical path Lt by the amounts as determined by the necessary setting operation. Thus, the respective color filter plates adjust the color balance of the light illuminating the transmission-type original T, or the light exposing the thermally processable light-sensitive material A, whereby the color balance of the final image to be formed is adjusted.

A variable diaphragm 184 for adjusting the quantity (intensity) of the light illuminating the transmission-type original T (namely, the exposing light) is positioned at the opening below the reflector 166b located downstream of the filter section. The variable diaphragm 184 is fitted with a drive unit 186. The variable diaphragm 184 is composed of light-shielding plates, a ND filter having a density gradient or the like. In the illustrated apparatus, the unit 186 controls the quantity of light by adjusting the amount in which the variable diaphragm 184 is to be inserted into the optical path Lt.

The drive unit 186 has the same construction as the drive unit 176. In order to set the conditions for image formation and in accordance with the amount of density adjustment to be performed by the user, as well as with the amount of density adjustment as determined by the modified conditions for exposure from the transmission-type original T, the drive unit 186 moves the variable diaphragm 184 to adjust the amount by which it is inserted into the optical path Lt. Thus, the amount of exposure to be given to the thermally processable light-sensitive material A, hence, the density of the image to be finally formed is adjusted. The amounts by which the respective color filter plates are inserted into the optical path by means of the drive unit 176 and the amount by which the variable diaphragm 184 is inserted into the optical path by means of the drive unit 186 are determined by a control unit 178.

A slit-defining member 164, a diffusion glass 180 and a Fresnel lens 182 are positioned downstream of the variable diaphragm 184. The member 164 determines the width of the slit through which light passes to expose the thermally processable light-sensitive material A. The diffusion glass 180 and the Fresnel lens 182 diffuse and mix the rays of light that has been color adjusted in the filter section so as to create uniform light that is free from the problem of unevenness in colors and illumination and which falls on the transmission-type original T normal to it.

The transmission-type original T is placed on a scan table 188 located downstream of the Fresnel lens 182. The scan table 188 holds the transmission-type original T in a predetermined position and the original T is scanned by transporting it in the directions indicated by the two-headed arrow in FIG. 3 in synchronism with the transport of the light-sensitive material A in the exposure unit 40.

The method of moving the transmission-type original T over the scan table 188 is in no way limited and any known transport means such as thread transmission, wrapping transmission (pulley and endless belt) or a rack and pinion adjustment may be effectively used. The moving speed of the original T is one nth of the transport speed of the thermally processable light-sensitive material A, with n being the copy ratio that is achievable by the film scanning unit 18.

The transmitted light that has passed through the transmission-type original T travels in the optical path Lt to be admitted into the zoom lens 152 located within the exposure unit 40. The transmitted light from the original T which has passed through the slit 164 undergoes magnification to 200%–850% by means of the zoom lens 152 to form an image at the exposing position in the exposing section 38.

The transmitted light from the original T which has passed through the zoom lens 152 has its optical path deflected by the mirror 154 through an angle of about 90° so that it is brought into agreement with the optical path L of the reflected light from the reflection-type original before it falls on the mirror 150. As already mentioned, the mirror 148 pivots to the position indicated by a dashed line in FIG. 3 when the image of the transmission-type original T is to be copied using the film scanning unit 18.

As in the case of the reflected light from the reflection-type original, the transmitted light from the original T that has been reflected downward by the mirror 150 is focused at a predetermined exposing position on the thermally processable light-sensitive material A in the process of transport by the roller pairs 38a and 38b, so as to perform slit scan exposure on the material A.

It should be noted that the transmission-type original T is moved by the scan table 188 in synchronism with the scan transport speed of the light-sensitive material A, namely, at a speed which is one nth of the transport speed of the light-sensitive material A, with n being the factor of magnification by the projection optics. Hence, the whole image of the original T is scanned for exposure on the light-sensitive material A as it is moved over the entire image region.

Prior to recording the image of the transmission-type original T, the illustrated apparatus performs prescanning so that the image of the original T is read for determining the amount of exposure for image recording, namely, the amounts by which the three color filter plates (Y filter 174Y, M filter 174M, and C filter 174C) in the filter section should be inserted into the optical path Lt, and the amount by which the variable diaphragm 184 should be inserted into the optical path Lt.

As FIG. 3 shows, moving mirror 156 is positioned upstream of the zoom lens 152 in such a way it can be inserted into or removed from the optical path Lt as required. During prescan, the moving mirror 156 is inserted into the optical path Lt as indicated by a dashed line in FIG. 3, whereby the transmitted light from the original T is deflected through an angle of 90°.

The transmitted light thus deflected in the optical path by the mirror 156 is adjusted for focus by means of the imaging lens 158 before it is admitted for imaging in the line sensor 160.

As showing in FIG. 4, the line sensor 160 consists of three rows of line sensors, one having a R filter, the second having a G filter, and the third having a B filter. Each line sensor is typically a 256-pixels-MOS (either NMOS or CMOS) line sensor which is capable of reading the image of transmission-type original T at a resolution of 256 pixels per line for each of the three primary colors R, G and B.

The output in the form of an image data signal from the line sensor 160 is forwarded to the control unit 178. Using the image signals that have been read by the line sensor 160, the control unit 178 displays a reproduced image on the monitor 19; at the same time, the control unit 178 determines image characteristic quantities from the acquired image signals so as to determine the conditions for proper exposure; if necessary, in response to the information on the position of the principal area as designated by the principal area designating means from the monitor image on the monitor 19 so as to determine the image characteristics of the principal area and modify the determined conditions for exposure; furthermore, if this is necessary, color and/or density manual adjustments may be added to the first determined conditions for exposure or the modified conditions for exposure so as to provide a third group of conditions for exposure; in accordance with the thus determined first group of conditions for exposure, the modified conditions for exposure or the third group of conditions for exposure including the manual color and/or density adjustments, the control unit 178 calculates the amounts of color and/or density adjustments, namely, the amounts by which color filters 174C, 174M and 174Y and/or variable diaphragm 184 are to be inserted into the optical path Lt; the information signals concerning the computed amounts of insertion are transmitted by the control unit 178 to the drive unit 176 for the color filter 174 and the control unit 186 for the variable diaphragm 184; the control unit 178 also controls the drive of not only the drive unit (not shown) for the scan table 188 and the other necessary parts of the illustrated image recording apparatus.

Figure 5:
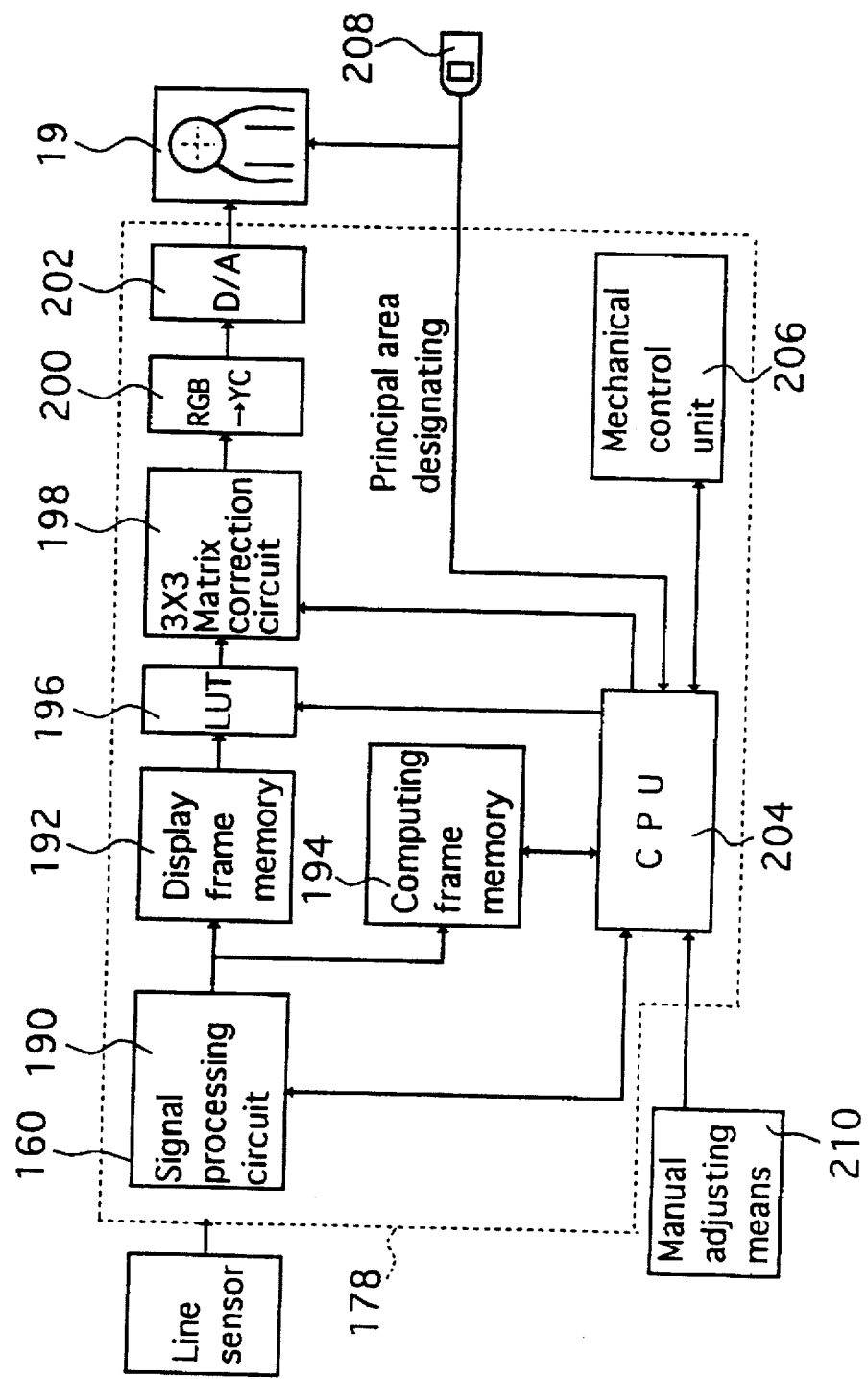
FIG. 5 is a simplified view showing the construction of the exposure control unit that is used in the optics for performing slit scan exposure in the image recording apparatus shown in FIG. 3.

As FIG. 5 shows, the control unit 178 comprises a signal processing circuit 190, a display frame memory 192, a computing frame memory 194, a display lookup table (hereunder abbreviated as "LUT") 196, a 3×3 matrix correction circuit 198, a luminance-chroma separation (hereunder designated as "YC separation") circuit 200, a video signal generator circuit 202, a CPU 204 and a mechanical control unit 206.

The signal processing circuit 190 performs various kinds of image signal processing, such as darkness correction, logarithmic transformation and light output correction, on the image signals that have been read by the line sensor 160. The circuit is controlled by the CPU 204.

The display frame memory 192 is for storing the color image signals for one frame (equivalent to one sheet of original) that have been processed with the signal processing circuit 190 and it is used to store the necessary volume of image signals for displaying a finer reproduced image on the monitor 19, as exemplified by 8-bit data for each of three colors in 256×256 (256×256×8×3B). The computing frame memory 194 stores those color image signals for one frame (equivalent to one sheet of original) that have been processed by the signal processing circuit 190 and which are necessary to compute the conditions for proper exposure, as exemplified by a quarter of the volume of data stored in the display frame memory 192, namely, 8-bit data for each of three colors in 128×128 (128×128×8×3B). The image data in the computing frame memory is read out of this memory by means of CPU 204 for computing the conditions for proper exposure; if desired, such image data may be so adapted that they are updatable after modification.

The display lookup table (LUT) 196 is used to perform, under the control of CPU 204, color density conversions for R, G and B on the image data in the display frame memory 192 on the basis of the large-area average transmission density as obtained in CPU 204. The 3×3 matrix correcting circuit 198 performs color correction, under the control of CPU 204, on the display R, G and B color density related image data that have been obtained in LUT 196. Thusly, one obtains R, G and B color density image data as corrected with LATD.

The R, G and B image data signals color corrected in the correcting circuit 198 are thence sent to the YC separating circuit 200, where they are separated into luminance signals for the pixels of interest and chroma signals obtained by subtracting the luminance signals from the R, G and B image data signals. The thus YC separated image data signals are sent to the video signal generator circuit 202, where they are D/A converted to generate video signals which, in turn, are transmitted to the monitor 19.

The monitor 19 is typically composed of a small-size LCD (liquid-crystal display); receiving the video signals as generated by the video signal generator circuit 202, the monitor 19 reproduces and displays the original image with high fidelity for color and density. The monitor 19 has principal area designating means (e.g. mouse) 208 connected thereto so that the principal area of the original image can be designated from the reproduced image displayed on the monitor screen. It should be mentioned that the monitor 19 is by no means limited to a LCD but may be replaced by another display device such as a CRT. The principal area designating means 208 also is not limited to a mouse but a cursor appearing on the monitor screen may be used to designate the principal area of the reproduced image on the monitor; alternatively, a keyboard or any other suitable means may be employed to serve the purpose. Information on the position of the principal area as designated by the principal area designating means 208 in the screen of the monitor 19, such as information on the positions of a two-dimensional coordinate (e.g. xy coordinate or rθ coordinate) or information for addressing the display frame memory 192 is transmitted to the CPU 204.

The term "the principal area" of the original image as used herein means the most important subject in the original image. With ordinary originals, particularly in the case of original images containing human subjects, the principal area is the face of each human subject or a skin-colored area, but in the case of original images containing no human subjects, the principal area can be any primary subject such as an automobile, furniture, a signboard, an animal, a flower, vegetable, a building, mountains, the sea and the sky for example. In short, the "principal area" of the original image is that area of the original image which occupies the dominant portion, such as the center, of the original image, to account for a significant proportion of the whole area and which, hence, is the most important part of the original image.

CPU 204 which is the essential part of the exposure control unit 178 controls all of the operations (see below) associated with the slit scan exposure from the transmission-type original T by means of the optics for slit scan exposure including the film scanning unit 18, as well as the synchronous transport line of the thermally processable light-sensitive material; e.g. the reading of the original image be prescanning, the processing of the image data thus obtained, the display of a reproduced image onto the monitor 19, computation of the conditions for exposure, correction of the conditions for exposure using the information on the position of the principal area as designated by the principal area designating means 208, adjustment of the unmodified or modified conditions for exposure by means of manual color and/or density adjusting means 210, and determining the amounts by which filters 174Y, 174C and 174M and the variable diaphragm 184 should be inserted into the optical path Lt in accordance with the thusly attained proper conditions for exposure (modified or adjusted values). All the data thus attained in the CPU 204 are thence transmitted to the mechanical control unit 206.

In response to the information on the position of the principal area as designated by the principal area designating means 208, CPU 204 specifies a certain pixel in the position of the principal area, extracts a certain number of pixels (say, 8 or 24 pixels) around the pixel of interest that are not extremely different from the pixel of interest in terms of the associated image signal data, and determines the average (for each of the primary colors, R, G and B) of the image signal data for both the pixel of interest and the surrounding pixels, and uses that average value as the density of the principal area of the original image. Any other known methods may be employed to determine the density of the principal area of the original image. The difference between the thus determined density of the principal area and the LATD may be used as an auxiliary value for the principal area.

The mechanical control unit 206 supplies the drive unit 176 for the color filters 174Y, 174M and 174C in the optics for slit scan exposure and the drive unit 186 for the variable diaphragm 184 with the amounts by which the respective color filters 174Y, 174M and 174C and the variable diaphragm 184 are to be inserted into the optical path Lt; these amounts of insertion are supplied as the amounts of movement, for example, the number of steps if the drive units use a stepping motor as the drive source; at the same time, the mechanical control unit 206 performs slit scan exposure from the transmission-type original T including not only the scanning transport of the scan table 188 carrying the original T in both prescanning and subsequent scanning steps but also the synchronous transport of the thermally processable light-sensitive material A during scanning that follows prescanning. Thus, the mechanical control unit 206 controls the overall drive of the image recording apparatus 10 of the invention.

As already mentioned, the photometric line sensor 160 to be used in the invention may typically have the construction shown in FIG. 4; the image data as read by this sensor are the same irrespective of whether they are used for displaying the original image on the monitor or for computing the conditions for proper exposure and, hence, the monitor image displayed on the monitor 19 has a high degree of match with the printed image, thus assuring high percentage of the reproduced print images passing a final quality check.

Figure 6:
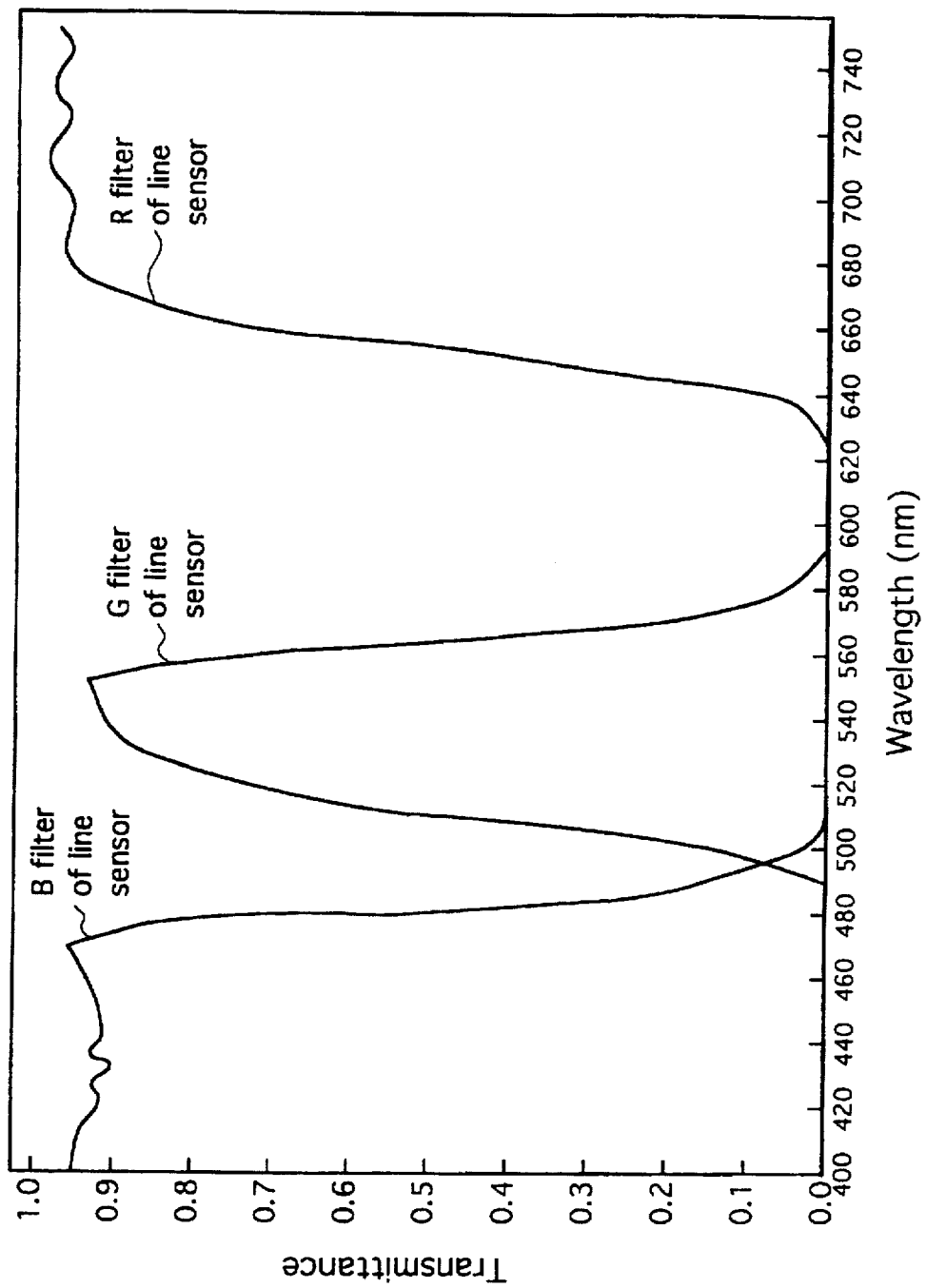
FIG. 6 is a graph showing the spectral sensitivities of exemplary R, G and B filters for use in the line sensor shown in FIG. 4.
Figure 7:
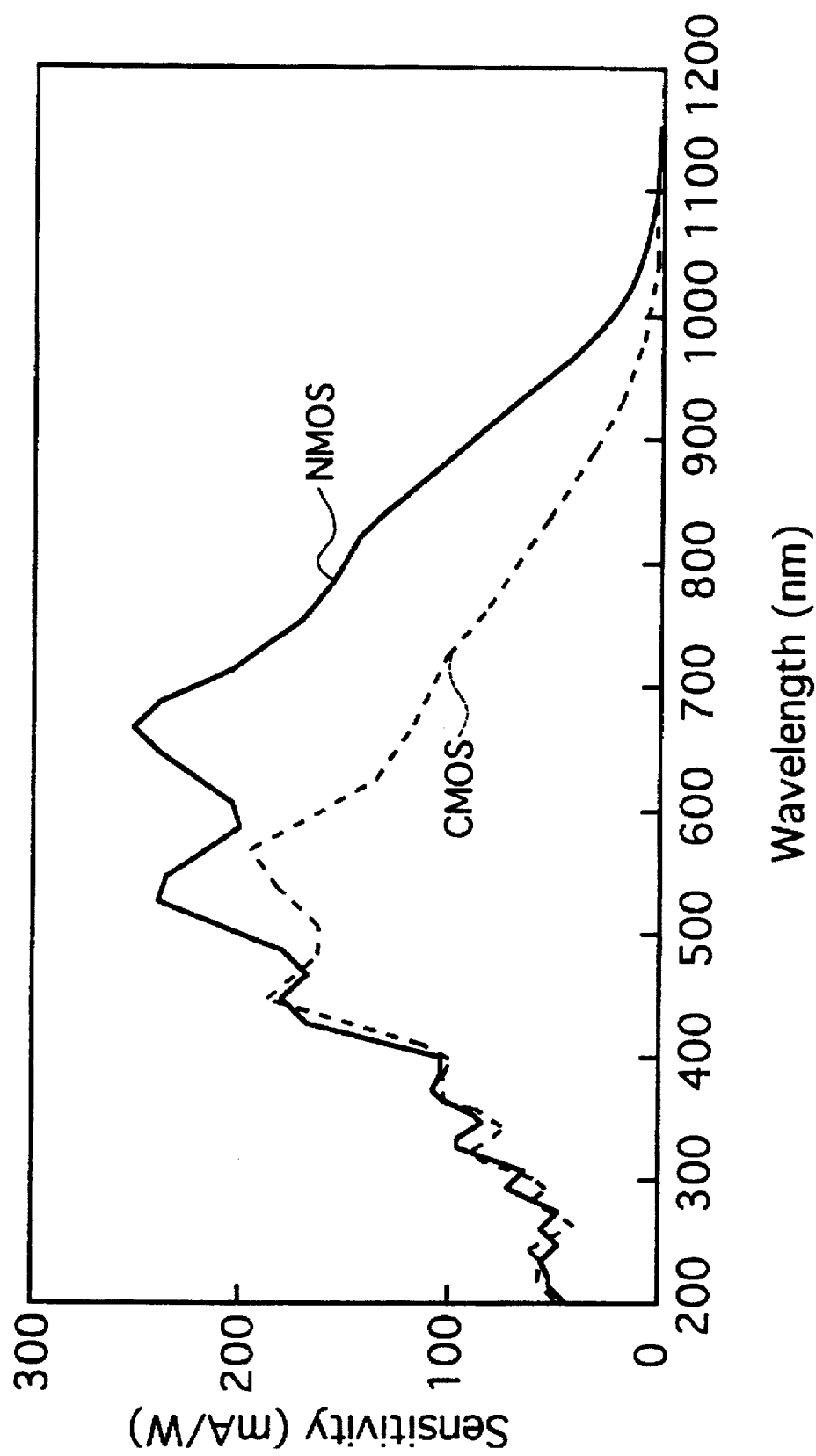
FIG. 7 is a graph showing the spectral sensitivities of exemplary CMOS and NMOS sensors for use in the line sensor shown in FIG. 4.

FIG. 6 shows the spectral sensitivity characteristics of the R, G and B filters in the line sensor 160 to be used in the invention; FIG. 7 shows the spectral sensitivity characteristics of a CMOS and an NMOS sensor that may be used in the line sensor.

Figure 8:
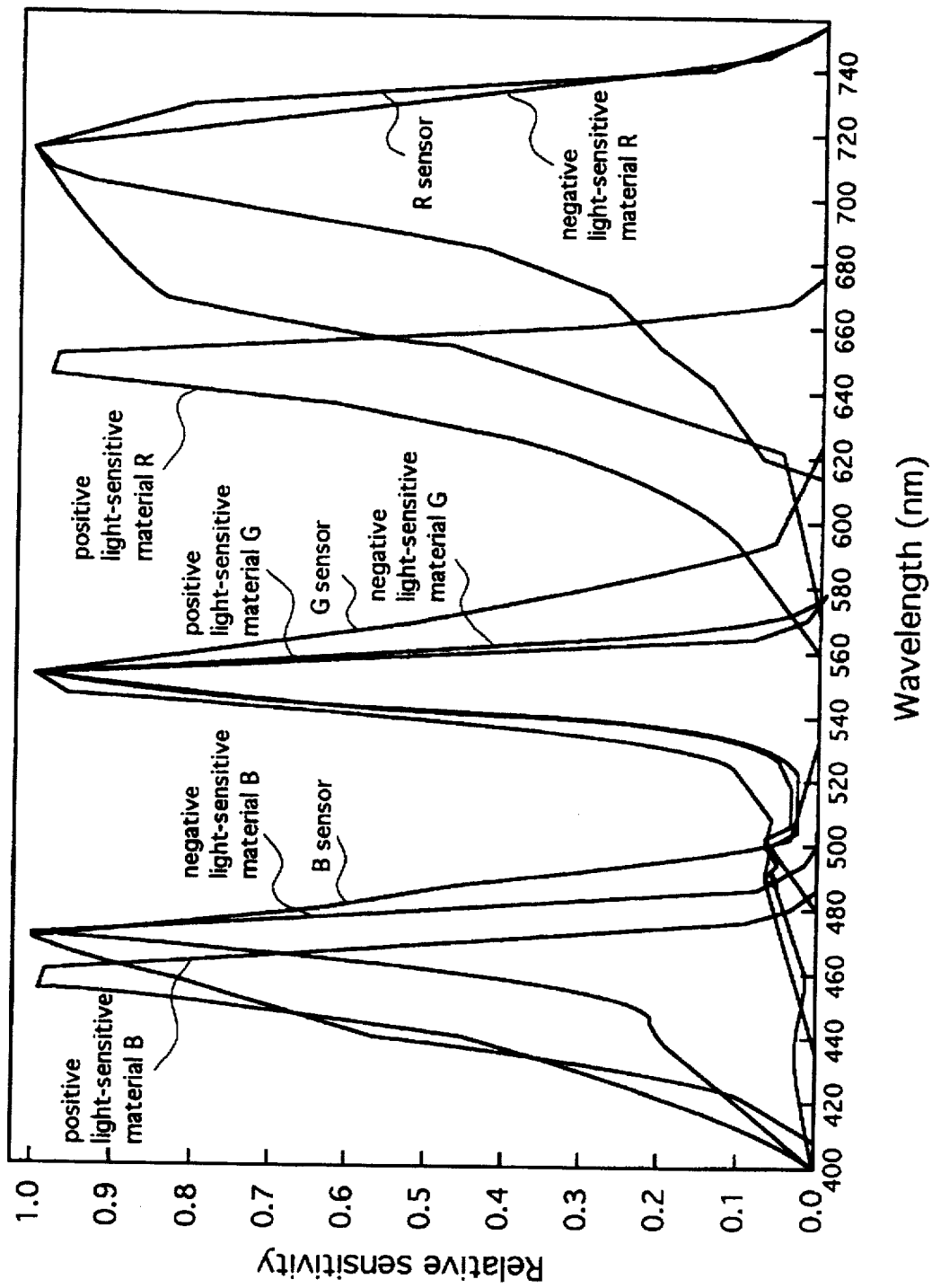
FIG. 8 is a graph showing exemplary spectral sensitivity characteristics of the line sensor shown in FIG. 4, as well as exemplary spectral sensitivity characteristics of positive and negative light-sensitive materials for use in the image recording apparatus shown in FIG. 1.

The invention is also characterized in that the line sensor 160 used as a photometric image sensor is designed to have spectral sensitivities that match the spectral sensitivities of the negative, thermally processable light-sensitive materials to be used, and that both color and density are controlled when performing slit scan exposure from a transmission-type negative original whereas only density is controlled when exposing is effected from a transmission-type positive original. FIG. 8 also shows the spectral sensitivities of the positive, thermally processable light-sensitive materials that may be used in the invention.

It should be mentioned here that the spectral sensitivities shown in FIG. 8 in association with the R, G and B sensors in the line sensor 160 are the finally effective sensitivities of the sensor taking into account the following associated components: light source 162, IR cut filter 168, UV cut filter 170, notch filter 172, R, B and G filters in the sensor, and CMOS sensor. Similarly, the spectral sensitivities shown in FIG. 8 in association with negative light-sensitive materials (NLSM) and positive light-sensitive material (PLSM) are those of a complete system using the light source 162 in combination with IR cut filter 168, UV cut filter 170 and notch filter 172.

Figure 9:
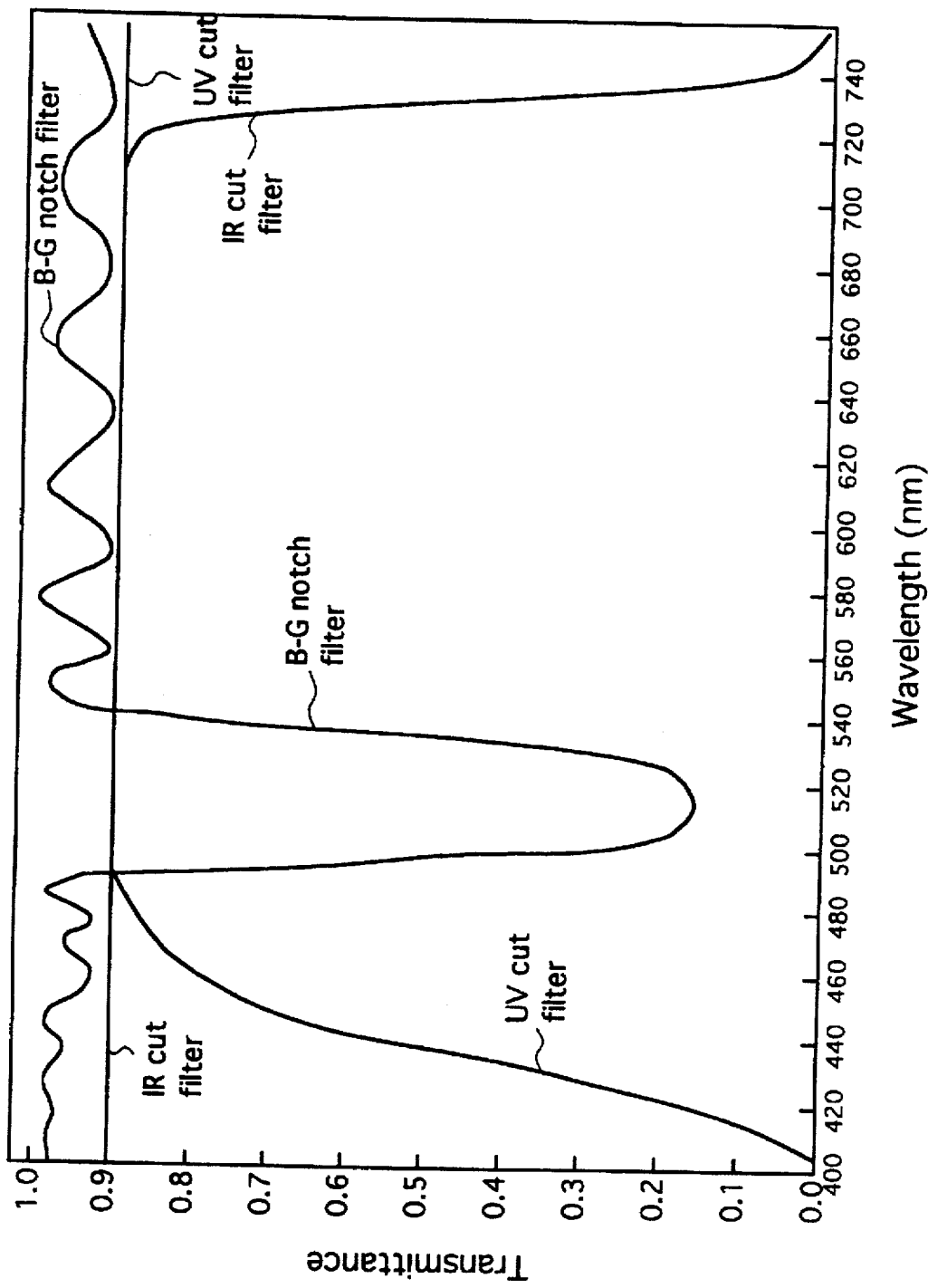
FIG. 9 is a graph showing exemplary spectral sensitivity characteristics of the IR cut filter, UV cut filter and notch filter for use in the film scanning unit shown in FIG. 3.
Figure 10:
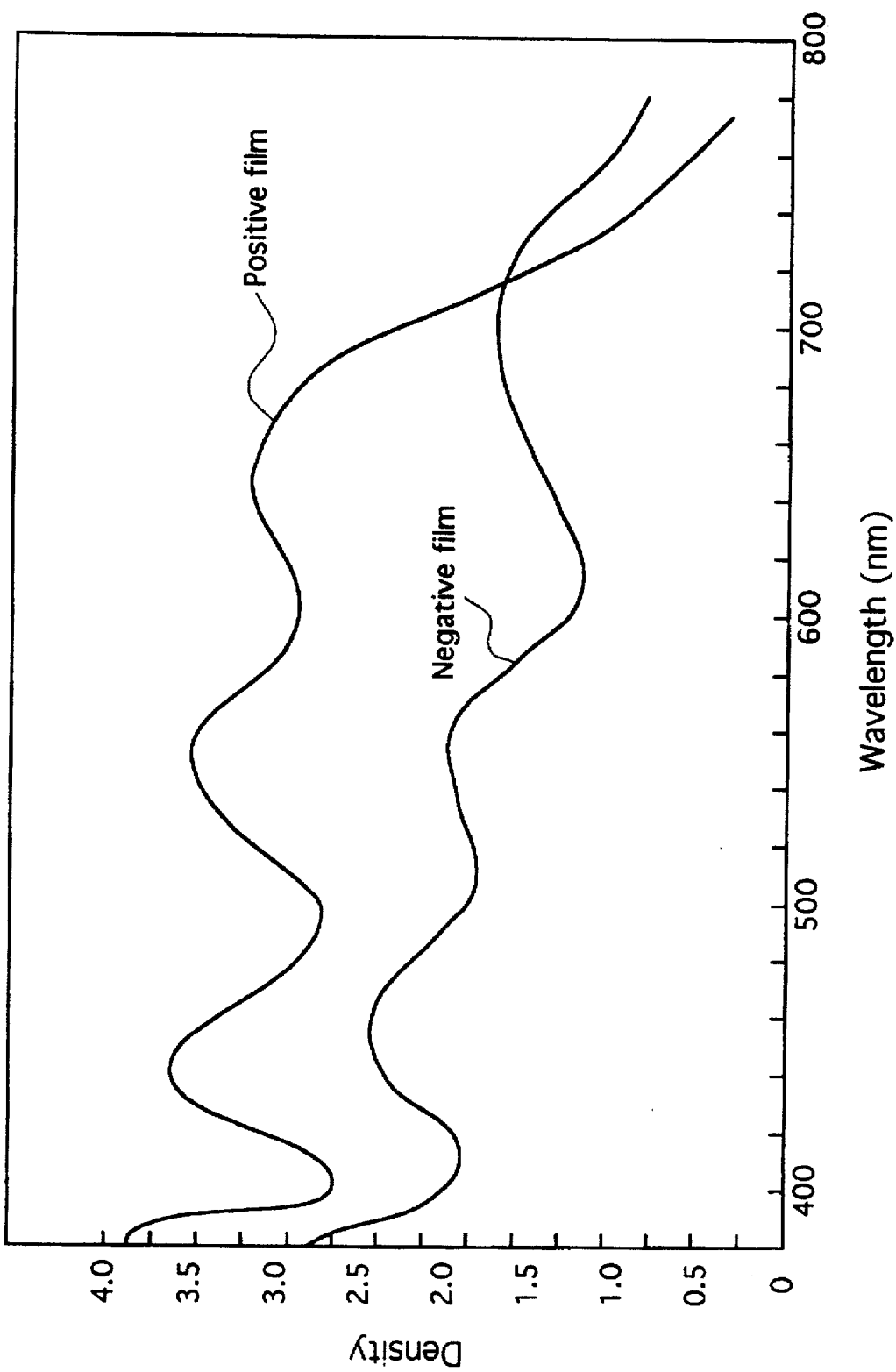
FIG. 10 is a graph showing exemplary spectral sensitivity characteristics of common negative and positive films.

In connection with the present discussion, the spectral sensitivity characteristics of the IR cut filter 168, UV cut filter 170 and notch filter 172 are shown in FIG. 9. The spectral sensitivity characteristics of the negative and positive films to be used are shown in FIG. 10.

Having described above the exposure control unit 178 for use in the invention, we will now describe a specific example of the exposure control that is to be performed by the CPU 204 in the invention.

The following discussion assumes that LATD(i) (i=C, M and Y), or the LATD values for the respective three colors C, M and Y in the original image of interest and that any other necessary data such as DNi (the stored value of normal controlled negative density), DUi (the stored value of under-controlled negative density) and DOi (the stored value of overcontrolled negative density) have already been calculated or stored in a memory (not shown) so that they can be read into the CPU 204 as required.

1) First, the difference between LATD(i) and the stored normal controlled negative density DNi is calculated as normalized density dens(i) by following formula:

$$dens(i)=LATD(i)-DNi$$

2) Then, using the stored undercontrolled negative density DUi and the stored overcontrolled negative density DOi, the normalized density dens(i) is processed for preadjustment in accordance with the following formulae:

Normalized under reference value: $DKUi=DUi-DNi<DU>=\Sigma DKUi \div 3$

Normalized over reference value: $DKOi=DOi-DNi<DO>=\Sigma DKOi \div 3$

When dens(i)>0, $$dens(i)=dens(i)\times <DO>+DKOi$$

When dens(i)≦0, $$dens(i)=dens(i)\times <DO>+DKUi$$

3) The normalized density dens(i) is processed for collection.

$$<D>=\Sigma dens(i) \div 3$$

$$dens(i)=(dens(i)-<D>)\times Ki \div 100 + <D>$$

where collection coefficient Ki is a given value which may be set at 100.

4) The value of total balance/slope is given by:
   Total balance/slope
   =Standard condition balance BhNi/slope ShUi, ShOi
   +market condition balance BsNi/SsUi, SsOi
   +negative balance BnNi/slope SnUin, SnOin (n=10 CH)
   +ROM slope (fixed value) SrUi, SrOi 5) Determine the external correction balance as follows:
   External correction balance
   =100 log(1+density correction step/100)
   ×manually corrected density
   +100 log(1+color correction step/100)
   ×manually corrected color value
   +100 log(1+density correction step/100)
   ×corrected density in color memory
   +100 log(1+color correction step/100)
   ×corrected color in color memory
   +corrected values for reciprocity law in magnification
   +corrected values for the difference in image-receiving sheet
   +corrected values for the principal area Typically, the density correction step is 20% and the color correction step is 10%.

The corrected values for reciprocity in magnification, those for the difference in image-receiving sheet and those for the principal area are specified as follows.

5-1) Corrected values for reciprocity in magnification

|   | 200 | 375 | 600 | 999% |
|---|---|---|---|---|
| C | $C_{200}$ | 0 | $C_{600}$ | $C_{999}$ |
| M | $M_{200}$ | 0 | $M_{600}$ | $M_{999}$ |
| Y | $Y_{200}$ | 0 | $Y_{600}$ | $Y_{999}$ |

C%, M%, Y% (%=200, 600, 900) are factory (market) adjustable.

Values between shall be determined by linear interpolation.

5-2) Corrected values for image-receiving sheet

|   | C | M | Y |
|---|---|---|---|
| Double weight | 0 | 0 | 0 |
| Medium weight | RCtyu | RMtyu | RYtyu |
| Matted double weight | RCma | RMma | RYma |
| Matted single weight | RCmu | RMmu | RYmu |
| OHP | RCohp | RMohp | RYohp |

5-3) Corrected values for the principal area
Kpd corrected density
Kpc corrected color 6) Calculate a CCF density from the normalized density dens(i) by referring to the calibration table for light adjustment.

When dens (i) <0, $$Di=Ri-100 \log 1.01 \times Bi - Ti - dens(i) - 100 \log 1.01 \times S(Ui) \times dens(i) + M(Ui)$$

When dens(i)≧0, $$Di=Ri-100 \log 1.01 \times Bi - Ti - dens(i) - 100 \log 1.01 \times S(Oi) \times dens(i) + M(Oi)$$

Where

Di=CCF (color correction filter) density
Ri=ROM balance
Bi=total balance
Ti=External correction balance
S(Ui)=Total under slope
S(Oi)=Total over slope
M(Ui)=Normalized under reference value
M(Oi)=Normalized over reference value 7) Calculate the position of CCF (color correction filter) from CCF density.

The calibration table for light adjustment is represented by gain values. Gain (n) (i) and corresponding position of CC filter, CC position (n) (i). Typically, n=40. Looking at this calibration table, find j that satisfies Gain (j) (i)≦Di≦Gain(j+1) (i). Thereafter, perform linear interpolation in this range and use the following equation to determine CC filter positions corresponding to respective gain values:

$$CCF(i)=\{(CCposition\ (j+1)(i)-CCposition(j)(i))/Gain\ (j+1)(i)-Gain\ (j)(i))\} \times (Di-Gain\ (j)(i))+CCposition\ (j)(i)$$

Thus, CPU 204 determines the conditions for exposure that take into account both LATD and the density of the principal area (as corrected); stated specifically, the amounts of color adjustment, or the positions of the respective color filters 174Y, 174M and 174C, or the amounts by which they should be inserted into the optical path Lt, are determined. The amount of density adjustment, namely, the position of the variable diaphragm 184, or the amount by which it should be inserted into the optical path Lt, can be determined in the same way. Therefore, prior to slit scan exposure of a thermally processable light-sensitive material, the illustrated image recording apparatus 10 prescans the original image T by reading with line sensor 160, then displays the prescanned original image T on monitor 19, designates the principal area of the original image T, and computes the conditions for exposure as appropriate for the actual state of the original image, for example, how a negative film was shot. By performing slit scan exposure of the thermally processable light-sensitive material form the original image T under the thus determined conditions for proper exposure, one can reproduce an image of high quality which has proper density and color levels. Therefore, the illustrated color image recording apparatus 10 yields printed images that involve very few rejects and which have feature a high likelihood for passing a final quality check.

The image recording apparatus 10 of the invention has basically the construction described above. We now describe the operation of this apparatus to copy the image of a transmission-type original T.

The operator first places the transmission-type original T on the scan table 188. After setting the copy ratio, the operator touches the START button. Then, the light source 162 turns on and the scan table 188 starts a prescan mode to scan the original T.

The light issuing from the light source 162 passes through the IR cut filter 168, the UV cut filter 170 and the B-G notch filter 172 successively to be admitted into the original T, and the transmitted light carrying the image information from the original T passes though the slit 164. In this operating mode, the respective color filters and the variable diaphragm 184 keep clear of the optical path Lt. Alternatively, they may be inserted into the optical path Lt in accordance with the standard conditions for exposure from the original T.

The transmitted light passing through the slit 164 is deflected through an angle of 90° by the moving mirror 156 which is inserted into the optical path Lt as indicated by a dashed line in FIG. 3 and then focused on the line sensor 160 by means of the imaging lens 158, where photometry is conducted for each of colors R, G and B; thus, the image of the original T is separated into the three primary colors R, G and B and read for each of these colors at a resolution of 256 pixels per line.

The output from the line sensor 160 is forwarded to the control unit 178, which performs the necessary processing (e.g. correction with LATD) on the output so that the original image that has been read is displayed as a reproduced image (which is a positive image if the original T is a negative film) on the monitor 19.

The operator watches the displayed image and designates the principal area by the principal area designating means such as a mouse. The CPU 204 in the control unit 178 determines various image characteristic quantities from the information on the position of the designated principal area and the LATD in the manner already described above, then determines the conditions for exposure (i.e., the amounts by which the respective color filter plates in the filter section should be inserted into the optical path Lt and the amount by which the variable diaphragm 184 should be inserted into the optical path Lt) from the determined image characteristic quantities; and supplies relevant instructions to the drive means 176 and 186.

In accordance with the thus determined conditions for exposure, the drive means 176 and 178 function to insert the respective color filter plates 174Y, 174M and 174C in the filter section and the variable diaphragm 184 into the optical path Lt, whereupon the moving mirror 156 is retracted from the optical path Lt by moving to the position indicated by a solid line in FIG. 3. Thereafter, the light source 162 turns on and the original T starts to be scanned for copying its image. As already mentioned, the speed of this scanning step is dependent on the speed at which the thermally processable light-sensitive material A is scanned in the exposing section 38 and on the copy ratio.

The light issuing from the light source 162 passes through the IR cut filter 168, the UV cut filter 170 and the B-G notch filter 172 successively and has its color and density (quantity) adjusted by the respective color filter plates 174Y, 174M and 174C and variable diaphragm 184 which have been inserted into the optical path Lt in accordance with the determined conditions for exposure; the thusly adjusted light is admitted through the original T and the transmitted light carrying the image information from the original T passes through the slit 164.

The light passing through the slit 164 is magnified to the copy ratio setting by means of the zoom lens 152 and thereafter reflected by the mirror 154. As already mentioned, for the copying of the original T, the mirror 148 pivots to the position indicated by a dashed line in FIG. 3, so the transmitted light is reflected by the mirror 150 to focus on the thermally processable light-sensitive material A which was withdrawn out of the magazine 20, cut to a predetermined length and transported through the exposing section 38 is synchronism with the above-described operation, thereby performing slit scan exposure on the material A.

The thusly exposed light-sensitive material A is brought into the switchback section 42, then reversed to enter the water applicator section 46, where it is coated with water which is an image forming solvent; thereafter, the image-receiving material B which was withdrawn out of the magazine 60, cut to a predetermined length and subsequently transported is combined with the light-sensitive material A by means of the laminating roller 80 and the resulting combination is brought into the thermal development and transfer section 58.

The combination of the light-sensitive material A and the image-receiving material B is subjected to thermal development and transfer as it is transported through the gap between the endless belt 96 and the heating drum 82. Thereafter, the light-sensitive material A is first stripped from the heating drum 82 by means of the strip finger 90 and then the image-receiving material B onto which the image has been transferred is stripped from the heating drum 82 by means of the strip finger 92.

The stripped light-sensitive material A is guided by the transport guide plate 114 and other associated members to be brought into the scrap light-sensitive material stack box 116, whereas the image-receiving material B carrying the transferred image is guided by the transport guide plates 118 and other associated members to be ejected onto the tray 126 to produce a hard copy.

The foregoing description of the image forming apparatus of the present invention is mostly directed to the case of forming image from a transmission-type original, particularly, a negative film. It should, however, be understood that this is not the sole case of the invention and it may be applied for copying image from positive transmission-type originals such as reversal films and lantern slides, as well as for forming image from reflection-type originals such as printed matter and photographs.

Needless to say, the image forming apparatus of the present invention is in no way limited to the case described above and various modifications and improvements can be made without departing from the spirit and scope of the invention.

As described in detail on the foregoing pages, the image recording apparatus of the invention is so designed that prior to the slit scan exposure of a light-sensitive material, an original image, particularly, the image of a transmission-type negative original which has a high potential for the occurrence of density or color failure is prescanned to read image signals and reproduced for display on a monitor; the operator then designates the principal area of the image on the monitor and sets the conditions for proper exposure on the basis of the acquired image signals and the information on the position of the principal area. Therefore, even if the originals to be duplicated are negative films or some other media that are inherently shot under varying conditions, the proper conditions for exposure can be determined to insure the reproduction of printed images with high fidelity of color and density levels.

Additionally, the apparatus of the invention uses the same sensor for both monitoring and photometry and the spectral sensitivity of the sensor is adjusted to match the spectral sensitivity of negative light-sensitive materials which need color adjustments. Hence, the image on the monitor has a high degree of match with the printed image and one can yield printed images of optimal finish not only from negative originals but also from positive originals (including transmission-type positive originals and reflection-type originals). In other words, the invention enables the production of printed images that involve very few rejects and which hence feature a high likelihood for passing a final quality check.

What is claimed is:

1. An image forming apparatus that comprises:

means for performing slit scan exposure on a light-sensitive material being transported in synchronism with the scanning of an original image;

a line sensor that is provided in an optical path branching from the optical path of slit exposing light in said slit scan exposure means and that reads said original image prior to the slit scan exposure of said light-sensitive material;

a memory for storing image signals as read by said line sensor;

a monitor for displaying a monitor image using the image signals stored in said memory;

means for designating the principal area of said original image from the image displayed on said monitor;

exposure computing means for computing the conditions for proper exposure using both the information on the principal area as designated by said principal area designating means and the image signals stored in said memory;

automatic adjusting means for adjusting image color and image density when a negative-positive light-sensitive material is used, and for adjusting only density when a positive-positive light-sensitive material for forming a positive image from positive originals is used, with both adjustments being based on conditions for exposure that have the characteristic quantities of the principal area added by said exposure computing means after it has been designated by the principal area designating means; and means for forming an image under the computed conditions.

2. An image forming apparatus according to claim 1 wherein said automatic adjusting means performs automatic color and/or density adjustments in accordance with given conditions for exposure, said original image is scanned by the slit scan exposure means and read by the line sensor prior to the slit scan exposure of said light-sensitive material, the acquired image signals are stored in the memory, processing is performed with the large-area transmission density as calculated from the stored image signals and the thus processed original image is reproduced and displayed on the monitor, said principal area is designated from the displayed monitor image by the principal area designating means and, after the conditions for proper exposure are computed from the information on the principal area as designated by the principal area designating means and the image signals stored in said memory, the color and/or density of said slit scan exposure means are adjusted automatically in accordance with the computed conditions for proper exposure, and slit scan exposure is performed on said light-sensitive material.

3. An image forming apparatus according to claim 1 which is furnished with such a capability that prior to the slit scan exposure of said light-sensitive material, a monitor image as modified by the conditions for proper exposure that have been computed by said exposure computing means is displayed on said monitor.

4. An image forming apparatus according to claim 1 which further includes means for manually adjusting the conditions for exposure by referring to the monitor image displayed on said monitor, and wherein said apparatus scans said original image by the slit scan exposure means and reads it by the line sensor prior to the slit scan exposure of said light-sensitive material, stores the acquired image signals in the memory, performs processing with the large-area transmission density as calculated from the stored image signals and reproduces the thus processed original image for display on the monitor, designates said principal area from the displayed monitor image by the principal area designating means, computes the conditions for proper exposure from the information on the principal area as designated by the principal area designating means and the image signals stored in said memory, then modifies the monitor image on the basis of the computed conditions for proper exposure, manually adjusts, as required, the computed conditions for proper exposure with reference being made to the displayed monitor image, thereafter adjusts the color and/or density of said slit scan exposure means on the basis of the adjusted conditions for proper exposure, and performs slit scan exposure on said light-sensitive material.

5. An image forming apparatus according to claim 1 wherein said line sensor has spectral sensitivities that approximate the spectral sensitivity characteristics of a negative-positive light-sensitive material for forming positive image from negative originals and the number of pixels that can be read by the line sensor is at least twice the size of the original.

* * * * *